(12) United States Patent
Fukuda et al.

(10) Patent No.: US 8,670,911 B2
(45) Date of Patent: Mar. 11, 2014

(54) VEHICLE STOP CONTROL DEVICE AND VEHICLE STOP CONTROL METHOD

(75) Inventors: Shotaro Fukuda, Obu (JP); Yukio Mori, Nagoya (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 90 days.

(21) Appl. No.: 12/977,328

(22) Filed: Dec. 23, 2010

(65) Prior Publication Data

US 2011/0160974 A1 Jun. 30, 2011

(30) Foreign Application Priority Data

Dec. 25, 2009 (JP) ................................ 2009-294647

(51) Int. Cl.
*G06F 7/70* (2006.01)

(52) U.S. Cl.
USPC .............. 701/70; 303/178; 180/197; 188/345

(58) Field of Classification Search
USPC ............ 701/70, 79, 96, 54, 55; 303/155, 178, 303/146, 113; 180/197; 188/345, 358
See application file for complete search history.

(56) References Cited

U.S. PATENT DOCUMENTS

| | | | |
|---|---|---|---|
| 4,430,714 A * | 2/1984 | Matsuda et al. ................. 701/79 |
| 4,852,950 A | 8/1989 | Murakami | |
| 5,575,542 A | 11/1996 | Tanaka et al. | |
| 2004/0113489 A1 * | 6/2004 | Iwagawa et al. .............. 303/155 |
| 2004/0227399 A1 * | 11/2004 | Sasaki ........................... 303/146 |
| 2005/0125134 A1 * | 6/2005 | Iwatsuki et al. ................ 701/70 |
| 2005/0218718 A1 * | 10/2005 | Iwatsuki et al. .............. 303/177 |
| 2005/0275285 A1 * | 12/2005 | Higuchi ........................ 303/146 |
| 2006/0064225 A1 * | 3/2006 | Tabata et al. .................... 701/96 |
| 2010/0023232 A1 * | 1/2010 | Isaji et al. ....................... 701/70 |
| 2011/0066345 A1 * | 3/2011 | Nasu et al. ...................... 701/70 |

FOREIGN PATENT DOCUMENTS

| | | |
|---|---|---|
| JP | 1-164656 A | 6/1989 |
| JP | H08-85431 A | 4/1996 |
| JP | 11-208439 A | 8/1999 |
| JP | 2000-006783 A | 1/2000 |
| JP | 2004-332680 A | 11/2004 |
| JP | 2008-001288 A | 1/2008 |

OTHER PUBLICATIONS

Japanese Notification of Reasons for Refusal dated Oct. 15, 2013 issued in the corresponding Japanese Patent Application No. 2009-294647 and English language translation.

* cited by examiner

*Primary Examiner* — Helal A Algahaim
*Assistant Examiner* — Shardul Patel
(74) *Attorney, Agent, or Firm* — Buchanan Ingersoll & Rooney PC (57) ABSTRACT

A vehicle stop control device is provided. The device is configured to perform a stop control for stopping a vehicle by adjusting a braking force for wheels and includes a target deceleration setting unit which sets a target deceleration as a target for stopping the vehicle so as to have a smaller value as a vehicle body velocity comes closer to zero, a deceleration obtaining unit which obtains a vehicle body deceleration of the vehicle, a control unit which performs the stop control of setting the braking force to have a smaller value as a subtraction value obtained by subtracting the target deceleration from the vehicle body deceleration is greater, and causing the set braking force to be applied to the wheels; and a determining unit which determines that a road surface is an ascent road when the braking force set by the control unit is zero.

6 Claims, 9 Drawing Sheets

VEHICLE STOP CONTROL DEVICE AND VEHICLE STOP CONTROL METHOD

CROSS REFERENCE TO RELATED APPLICATIONS

This application is based on and claims priority under 35 U.S.C. §119 to Japanese Patent Application 2009-294647, filed on Dec. 25, 2009, the entire content of which is incorporated herein by reference.

BACKGROUND

1. Field of the Invention

The present invention relates to a vehicle stop control device and a vehicle stop control method by adjusting a braking force with respective to wheels to stop the vehicle.

2. Description of Related Art

Generally, when the vehicle is stopped by applying the braking force to the wheels of the vehicle, a so-called "swing-back" occurs, in which after a center of gravity of the vehicle body is moved forward before the vehicle is stopped, the center of gravity of the vehicle is moved backward by a force of restoration of the vehicle suspension, or the like at the time of the stopping of the vehicle. This swing-back causes displeasure to passengers in the vehicle. Therefore, for example, JP-A-H1-164656 or JP-A-H11-208439 has proposed a vehicle stop control device which adjusts the braking force or driving force automatically in the vehicle such that deceleration of the vehicle becomes almost "zero" immediately before the vehicle is stopped in order to suppress the swing-back at the stopping of the vehicle, even if the driver of the vehicle does not operate an accelerator pedal or a brake pedal.

In the stop control device of JP-A-H1-164656 (hereinafter, also referred to as "first conventional device"), a liquid pressure within a master cylinder (also referred to as "MC pressure") is detected based on a detected signal which is output from a liquid pressure-sensor according to a depression amount of the brake pedal of the driver, and assumes a reference deceleration which is greater as the MC pressure is higher. Furthermore, in the first conventional device, in the case where the driver depresses the brake pedal, when an actual deceleration of the vehicle is greater than the reference deceleration, it is determined that a road surface on which the vehicle is driving is an ascent road, and braking control for the ascent road is performed. As a result, the swing-back is suppressed when the vehicle is stopped even when the vehicle is driving on the ascent road.

In the stop control device of JP-A-H11-208439 (hereinafter, also referred to as "the second conventional device"), it is determined whether the road surface which the vehicle is driving is any one of a horizontal road, an ascent road or a descent road based on a detected signal output from an inclination angle detection sensor such as an acceleration sensor, etc. Further, in the second conventional device, when it is determined that the road surface which the vehicle is driving is the ascent road, the braking force which is applied to the respective wheel of the vehicle is released during a predetermined time after the vehicle is stopped, and a driving force, which is of an extent that the backward movement of the vehicle can be suppressed, is transferred to the wheels of the vehicle. As a result, the swing-back is suppressed when the vehicle is stopped, and the backward movement of the vehicle is suppressed.

However, recently, there has been a demand for the miniaturization and cost reduction of a vehicle-mounted brake actuator. Accordingly, there is a possibility that brake actuators not having a liquid pressure sensor or an acceleration sensor are mounted on a vehicle. In each conventional stop control device, the brake actuator not having the liquid pressure sensor or the acceleration sensor cannot be controlled properly since it cannot be determined whether the road surface which the vehicle is driving is an ascent road or a descent road. Therefore, the braking force of the vehicle cannot be adjusted properly when the road surface is the ascent road. As a result, there is a concern that the effect of suppressing the swing-back when stopping the vehicle cannot be obtained. Thus, technical developments are needed that can detect whether the road surface is an ascent road without using the detected signal output from the liquid pressure sensor or the acceleration sensor. Herein, "the ascent road" means that the road has a slope (an inclination angle) on which the vehicle is caused to move backward when braking force is not applied to the vehicle.

SUMMARY

The present invention has been made to solve the problem described above, and it is an aspect of the present invention to provide a vehicle stop control device and a vehicle stop control method, which can detect whether the road surface which the vehicle is driving is an ascent road without using the liquid pressure sensor or the acceleration sensor.

According to an illustrative embodiment of the present invention, there is provided a vehicle stop control device configured to perform a stop control for stopping a vehicle by adjusting a braking force for wheels while the vehicle is decelerating. The vehicle stop control device comprises: a target deceleration setting unit configured to set a target deceleration as a target for stopping the vehicle so as to have a smaller value as a vehicle body velocity comes closer to zero; a deceleration obtaining unit configured to obtain a vehicle body deceleration of the vehicle; a control unit configured to perform the stop control which sets the braking force to have a smaller value as a subtraction value which is the result of subtracting the target deceleration set by the target deceleration setting unit from the vehicle body deceleration obtained by the deceleration obtaining unit is greater, and causes the set braking force to be applied to the wheels; and a determining unit configured to determine that a road surface which the vehicle is driving on is an ascent road when the braking force set by the control unit is zero.

Generally, when the vehicle is stopped during driving on the ascent road, a driving force of the traveling direction of the vehicle transferred from a driving source to the wheels, a force based on gravity applied to the vehicle body (hereinafter, called "a gravity equivalent") and the braking force of the wheels are applied to the vehicle. In this case, the gravity equivalent and the braking force are the forces that act in the reverse direction to the traveling direction of the vehicle (i.e., the direction opposite to the direction of the driving force), and the gravity equivalent becomes greater according to the slope of the road surface. As a result, the force according to a difference between the sum of the gravity equivalent and the braking force and the driving force, is applied to the vehicle. Furthermore, when the stop control is performed, the vehicle body deceleration is made to reach the target deceleration by adjusting the force according to the above described difference. More specifically, the vehicle body deceleration is made to reach the target deceleration by making the braking force small. Further, if the vehicle body deceleration is the deceleration which is determined from the force relationship between the driving force and the gravity equivalent, the braking force of the wheels will be adjusted to zero. That is, since the braking force cannot be less than zero, the vehicle body deceleration cannot reach the target deceleration. Therefore, the subtracted value obtained by subtracting the target deceleration from the vehicle body deceleration, becomes great as the vehicle body velocity becomes lower.

Thus, according to the above configuration, when the braking force which is set based on the subtraction value is zero, the road surface which the vehicle is driving on is determined to be an ascent road. That is, by using the braking force BP which is obtained as a necessary parameter of the stop control for stopping the vehicle, it is determined whether the road surface is an ascent road or not. Therefore, the braking force BP can be obtained without using the accelerator sensor or the liquid pressure sensor, etc. Thus, it can be detected that the road surface is the ascent road without using the liquid pressure sensor or the accelerator sensor.

In the above vehicle stop control device, the control unit may be configured to set the braking force according to the subtraction value by a first calculation processing including an integral calculation before the road surface which the vehicle is driving on is determined to be the ascent road by the determining unit, and set the braking force according to the subtraction value by a second calculation processing which does not include an integral calculation after the road surface is determined to be the ascent road by the determining unit.

The slope of the road surface may become small after the road surface is determined to be an ascent road. In the above case, since the gravity equivalent becomes small according to the variation of the slope, there is a possibility that application of the braking force to the wheels will be necessary in order to stop the vehicle. Here, if the braking force is set by the first calculation processing including the integral calculation even after the ascent road determination is made, by the characteristic of the integral calculation, regardless of the necessity of the braking force which is applied to the wheels, the braking force is hardly set to a value which is greater than zero. Therefore, there is a possibility that a lapse from the stopping of the vehicle to start of the braking force applied to the wheels will occur. In this case, there is a concern such that the vehicle will not stop and will continuously move forward, and this causes displeasure to the passengers in the vehicle. However, according to the above configuration, the braking force is set by the second calculation processing which does not include the integral calculation after the road surface is determined to be an ascent road. Therefore, even when the vehicle has not yet stopped or after it has been determined that the vehicle is in the process of driving on the ascent road, if the braking force needs to be applied to the wheels, the braking force according to the subtraction value is rapidly set to a value greater than zero by the second calculation processing. As a result, the braking force can be rapidly applied to the wheels and this contributes to the stopping of the vehicle.

In the above vehicle stop control device, the second calculation processing may include at least one of a proportional calculation and a differential calculation, to set the braking force according to the subtraction value.

According to the above configuration, after the road surface is determined to be an ascent road, the braking force is set by at least one calculation of the proportional calculation and the differential calculation. Therefore, even in the case when the vehicle is not yet stopped or after it is determined that the vehicle is in the process of driving on the ascent road, if the braking force needs to be applied to the wheels, the braking force of the wheels can be applied rapidly. Thus, lengthening of the stopping distance of the vehicle can be suppressed.

In the above vehicle stop control device, after the road surface which the vehicle is driving on is determined to be the ascent road by the determining unit, when the braking force which is set according to the subtraction value becomes a value greater than zero, the control unit may perform the stop control such that the braking force according to the subtraction value is set by the first calculation processing and causes the braking force to be applied to the wheels.

According to the above configuration, when the braking force that is set by the second calculation processing is a value greater than zero after the road surface which the vehicle is driving on is determined to be an ascent road, it is determined there is possible that the road surface becomes not an ascent road. Therefore, the calculation processing for setting the braking force is changed to the first calculation processing which includes the integral calculation, and the braking force which is set by the first calculation processing is applied to the wheels. Thus, compared to the case where the braking force which is set by the second calculation processing is applied to the wheels, the braking force of the wheels can be adjusted properly.

The above vehicle stop control device may further comprise a target braking force setting unit configured to set a target braking force based on the vehicle body deceleration obtained by the deceleration obtaining unit during a time period from a time when the road surface is determined to be the ascent road by the determining unit to a time when the vehicle is stopped. After the road surface is determined to be the ascent road by the determining unit, when it is detected that the vehicle is stopped, the control unit may perform the stop control such that the braking force to the wheels reaches the target braking force set by the target braking force setting unit.

The vehicle body deceleration which is obtained during a time period from the time when the road surface which the vehicle is driving on is determined to be an ascent road to the time when the vehicle is stopped, should be the value according to the gravity equivalent. Thus, in the above vehicle stop control device, when the vehicle is stopped on the ascent road, the target braking force is set to a necessary and sufficient value according to the present road condition, based on the vehicle body deceleration which is obtained during a time period from the time when the road surface is determined to be an ascent road to the time when the vehicle is stopped. Further, the backward movement of the vehicle is regulated by applying the target braking force to the wheels. Therefore, compared to the case when the braking force greater than necessary braking force is applied to the wheels, power consumption of a brake actuator that is operated based on the controlling of the stop control device and applies the braking force to the wheels, can be suppressed.

In the above vehicle stop control device, after the road surface is determined to be the ascent road by the determining unit, when it is detected that the vehicle is stopped, the control unit may perform the stop control such that the braking force to the wheels reaches a target braking force which is a preset value corresponding to an assumed maximum value of a slope of the road surface.

According to the above configuration, when the vehicle is stopped on the ascent road, the large braking force (the target braking force) is applied to the wheels regardless of the inclination of the slope (the inclination angle) of the road surface. Therefore, the backward movement of the vehicle can be regulated.

According to another illustrative embodiment of the present invention, there is provided a vehicle stop control method for stopping a vehicle by adjusting a braking force for wheels while the vehicle is decelerating, the method comprising: setting a target deceleration as a target for stopping the vehicle so as to have a smaller value as a vehicle body velocity comes closer to zero; obtaining a vehicle body deceleration; performing braking while setting the braking force to have a smaller value as a subtraction value which is the result of subtracting the set target deceleration from the obtained vehicle body deceleration to cause the set braking force to be applied to the wheels; and determining a road surface which the vehicle is driving on is an ascent road when the set braking force is zero.

According to the above configuration, the same effect as the vehicle stop control device described above can be obtained.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Illustrative Embodiment

The first illustrative embodiment of the present invention is described with reference to FIG. 1 to FIG. 9. Also, hereinafter, a traveling direction (a driving direction) of a vehicle is referred to as frontward (a front side of the vehicle).

Figure 1:
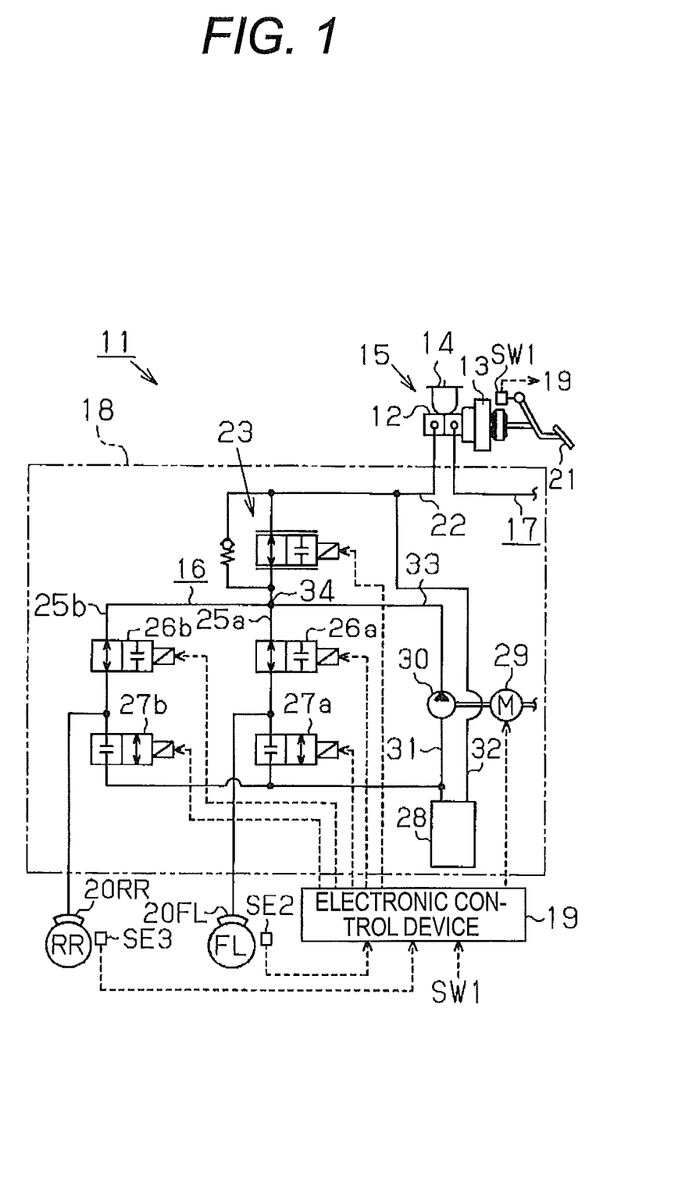
FIG. 1 is a block diagram that illustrates a portion of a braking device of a vehicle according to a first illustrative embodiment of the present invention.
Figure 2:
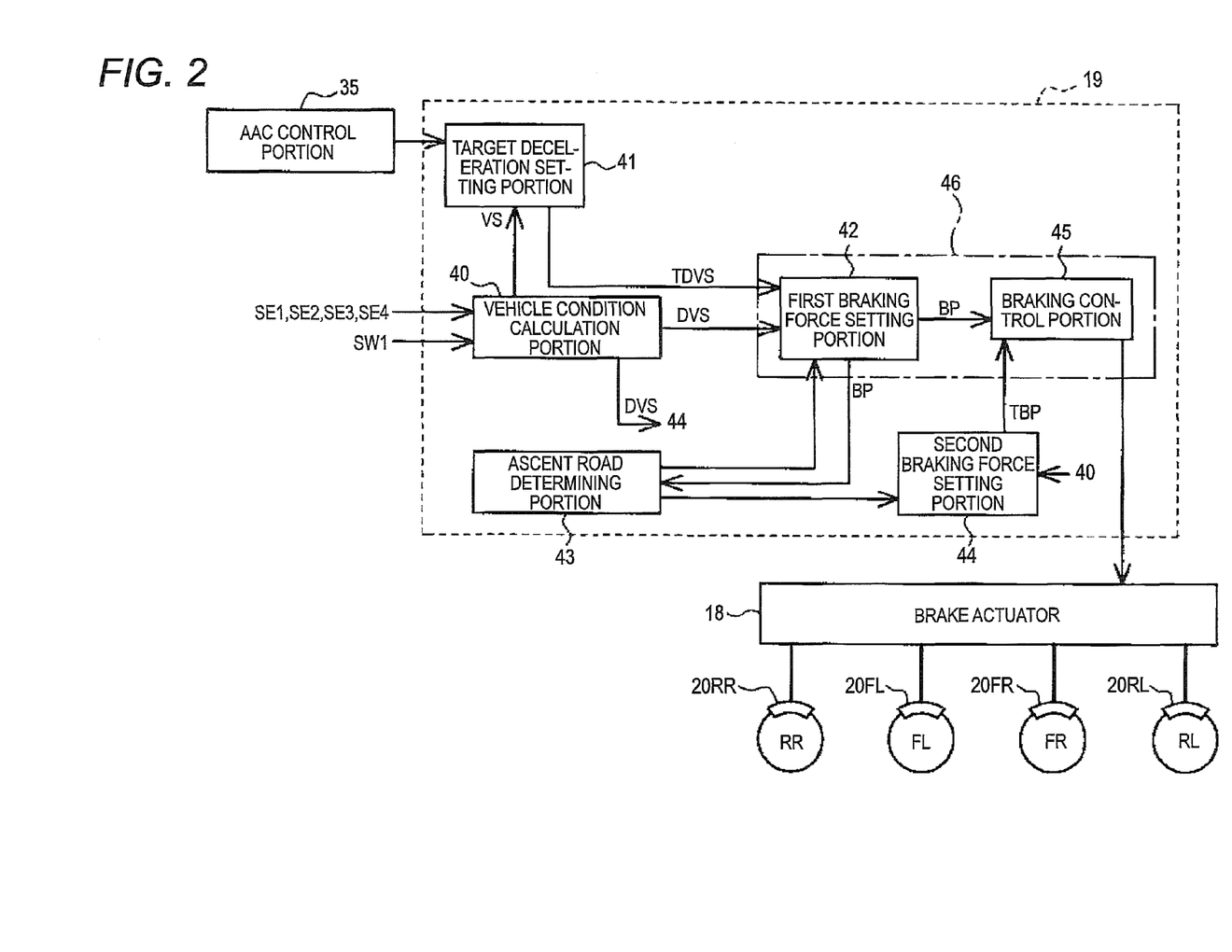
FIG. 2 is a block diagram that illustrates a main part of an electric configuration of the braking device.

The vehicle in the illustrative embodiment is an automatic four wheel drive vehicle that includes a right front wheel FR, a left front wheel FL, a right rear wheel RR and a left rear wheel RL (see FIG. 2). In the above vehicle, the vehicle is driven by driving wheels (for example, rear wheels) to which driving force is transferred according to a depressing operation of an accelerator pedal (not shown) performed by the driver. As illustrated in FIG. 1, a braking device 11 is mounted on the vehicle so as to apply a braking force to respective wheels FR, FL, RR, RL.

The braking device 11 includes: a liquid pressure generating device 15 that has a master cylinder 12, a booster 13 and a reservoir 14; a brake actuator 18 (shown with two dot-dashed line in FIG. 1) that has two liquid pressure circuits 16, 17; an electronic control device 19 (hereinafter, also referred to "ECU") as the stop control device for controlling the brake actuator 18. The liquid pressure circuits 16, 17 are each connected to the master cylinder 12 of the liquid pressure generating device 15 respectively. Further, as shown in FIG. 1 and FIG. 2, a wheel cylinder 20FL for the left front wheel FL and a wheel cylinder 20RR for the right rear wheel RR are connected to the first liquid pressure circuit 16, and a wheel cylinder 20FR for the right front wheel FR and a wheel cylinder 20RL for the left rear wheel RL are connected to the second liquid pressure circuit 17.

The liquid pressure generating device 15 is provided with a brake pedal 21. When the driver of the vehicle manipulates the brake pedal 21, the master cylinder 12 and the booster 13 are operated respectively. Further, a braking fluid is fed into the wheel cylinders 20FR, 20FL, 20RR, 20RL via the liquid pressure circuit 16, 17 from the master cylinder 12, and a braking force is applied to the wheels FR, FL, RR, RL respectively according to a differential pressure between the pressure of the master cylinder within the master cylinder 12 and the pressure of the wheel cylinder with the wheel cylinders 20FR, 20FL, 20RR, 20RL.

Next, the brake actuator 18 is explained. The liquid pressure circuits 16 and 17 have approximately the same configuration. Thus, in FIG. 1, only the first liquid pressure circuit 16 is described and the description of the second liquid pressure circuit 17 is omitted for the explanation.

The first liquid pressure circuit 16 is connected to the master cylinder 12 via a connection pathway 22, and a normal opening type-linear electromagnetic valve 23 is installed in the connection pathway 22. Further, the first liquid pressure circuit 16 includes a pathway 25a for the left front wheel connected to the wheel cylinder 20FL, and a pathway 25b for the right rear wheel connected to the wheel cylinder 20RR. Further, a booster valve 26a, 26b (a valve for increasing the pressure) as the normal opening type-electromagnetic valve that is operated when the booster of the pressure within the wheel cylinder 20FL, 20RR is restrained, and a decompression valve 27a, 27b as the normal closing type-electromagnetic valve that is operated when depressurizing the pressure within the wheel cylinder 20FL, 20RR, are installed in the respective pathways 25a, 25b.

Further, the reservoir 28 for temporarily storing the braking fluid that is discharged via the decompression valves 27a, 27b from the respective wheel cylinders 20FL, 20RR, and a pump 30 that is operated based on a rotation of a motor 29, are connected to the first liquid pressure circuit 16. The reservoir 28 is connected to the pump 30 via a flow path 31 for intake, and is connected to the master cylinder 12 side rather than the linear electromagnetic valve 23 side, at the connection pathway 22 via the master side flow path 32. Further, the pump 30 is connected to a connection portion 34 that is installed between the booster valves 26a, 26b and the linear electromagnetic valve 23 at the first liquid pressure circuit 16 via a flow path 33 for feeding. When the motor 29 is rotated, the pump 30 suctions the braking fluid via the flow path 31 for intake 31 and the master-side flow path 32 from the reservoir 28 and the master cylinder 12 side, and the braking fluid is discharged into the flow path 33 for feeding.

Next, ECU 19 of the illustrative embodiment is explained. A brake switch SW1 and a wheel velocity sensor SE1, SE2, SE3, SE 4 for detecting the wheel velocity of the respective wheels "FR, FL, RR, RL," are connected electrically in an interface (not shown) of ECU 19. Further, an ACC control portion (as one example, an ECU for an engine) for performing an adaptive cruise control is connected to the interface of the ECU 19 in a state where the ACC control portion can send and receive various pieces of information and various commands (braking command, etc.). Further, the braking actuator 18 is electrically connected to the interface of the ECU 19. The ECU 19 controls the braking actuator 18, based on the detected signal output from the respective wheel sensors SE1 to SE 4 and the brake switch SW1 or a command signal output from the ACC control portion 35, etc.

Here, the adaptive cruise control means the control that includes a constant velocity running control that performs control of an assumed vehicle body velocity VS of the vehicle to become a target vehicle body velocity, and a following running control that performs the control that causes the vehicle to follow the preceding vehicle. The adaptive cruise control of the illustrative embodiment includes a stop control so as to stop the vehicle in response to the stopping of the preceding vehicle. The stop control is performed immediately (for example, from after it becomes to equal to or less than 15 Km/h) before the vehicle is stopped automatically according to the deceleration of the vehicle. Further, the stop control of the illustrative embodiment includes suppressing so-called swing back, in which a gravity center of the vehicle body is moved backward by the restoration force of the suspension, etc. at the time of the stopping of the vehicle after a gravity center of vehicle is moved forward before the stopping of the vehicle.

Further, ECU 19 includes: a digital computer (not shown) that includes a CPU, a ROM and a RAM, etc.; a driver circuit (not shown) that drives the motor 29 and various valves 23, 26a, 26b, 27a, 27b. As such, ECU 19 includes: a vehicle condition calculation portion 40, a target deceleration setting portion 41, a first braking force setting portion 42, an ascent road determining portion 43, a second braking force setting portion 44, and a braking control portion 45, as functional portions that are realized respectively by at least one of hardware and software.

The detected signal from the respective wheel velocity sensors SE1 to SE4 and the brake switch SW1 is input to the vehicle condition calculation portion 40 respectively. The vehicle calculation portion 40 performs the calculations of the wheel velocity of the respective wheels FR, FL, RR, RL, the assumed vehicle body velocity VS of the vehicle, and the vehicle body deceleration DVS of the vehicle, etc. Therefore, in the illustrative embodiment, the vehicle condition calculation portion 40 functions as a deceleration obtaining unit. Also, the vehicle condition calculation portion 40 properly outputs information which indicates the assumed vehicle body velocity VS to the target deceleration setting portion 41, and properly outputs information which indicates the vehicle deceleration DVS to the first braking force setting portion 42 and the second braking force setting portion 44.

Figure 3:
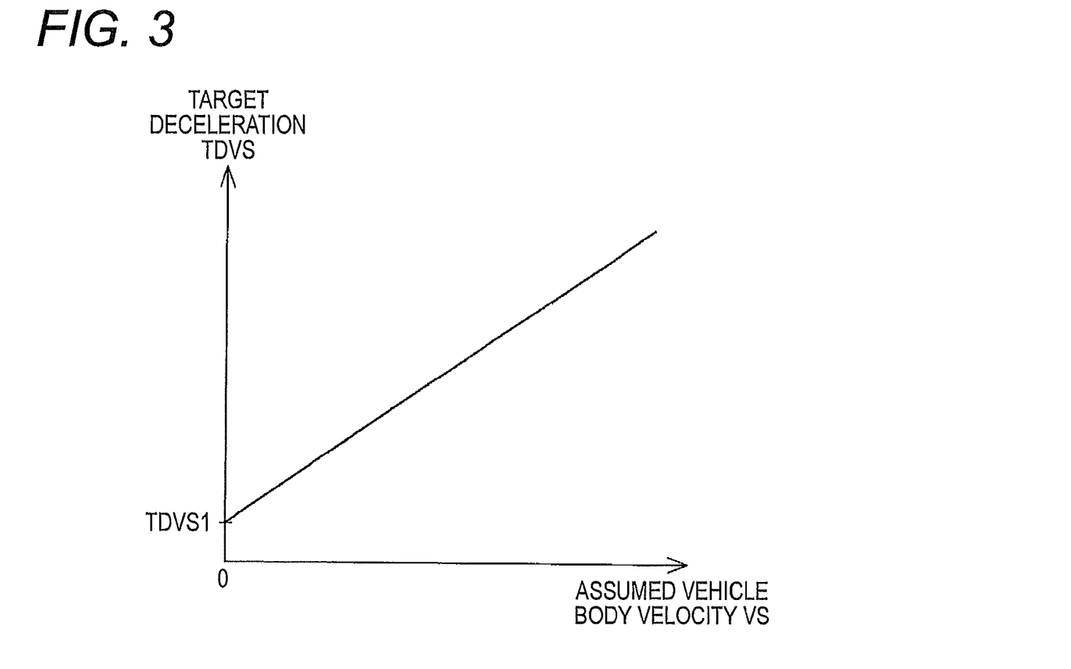
FIG. 3 is a graph that illustrates a relationship between an assumed vehicle body velocity and a target deceleration.

The target deceleration setting portion 41 includes a memory portion (not shown) that stores the graph illustrated in FIG. 3. Further, in the target deceleration setting portion 41, when the control command, such as an instruction that the stop control should be performed from the ACC control portion 35, is input, the target deceleration TDVS is set by using the graph of FIG. 3 as a target for stopping the vehicle while suppressing the swing over occurring at the stopping of the vehicle, and the information which indicates the target deceleration TDVS is properly output to the first braking force setting portion 42. Therefore, in the illustrative embodiment, the target deceleration setting portion 41 functions as a target deceleration setting unit. The target deceleration setting portion 41 sets the target deceleration TDVS to zero when the vehicle is driven at constant velocity and sets the target deceleration TDVS to be a predetermined value when the vehicle is decelerated.

FIG. 3 is an example of graph that illustrate a relationship between an assumed vehicle body velocity VS and a target deceleration TDVS. As shown in FIG. 3, the target deceleration TDVS is set to a minimum deceleration TDVS1 when the assumed vehicle body velocity VS is zero, and set to a larger value as the assumed vehicle body velocity VS becomes larger when the assumed vehicle body velocity VS is greater than zero.

Referring to FIG. 2 again, the first braking force setting portion 42 obtains a subtraction value DVsub (see FIG. 5) by subtracting the target deceleration TDVS obtained in the target deceleration setting portion 41 from a vehicle body deceleration DVS calculated in the vehicle condition calculating portion 40, the braking force BP which is applied to the respective wheels FR, FL, RR, RL is set to be greater as the subtraction value DVsub becomes greater. Further, the first braking force setting portion 42 properly outputs information which indicates the set braking force BP to the ascent road determining portion 43 and the braking control portion 45. Also, when the stop control is not performed, the first braking force setting portion 42 outputs information which indicates the set braking force BP to only the braking control portion 45.

In the illustrative embodiment, the calculation method of the braking force BP of the first braking force setting portion 42 is performed differently between the case where the road surface which the vehicle is driving is determined to be an ascent road by the ascent road determining portion 43 and the case where the road surface is determined to not be an ascent road by the ascent road determining portion 43. That is, when the road surface is determined not to be an ascent road by the ascent road determining portion 43, the first braking force setting portion 42 performs a first calculation processing to obtain the total value of the calculation result by a proportional calculation P, an calculation result by an integral calculation I, and a calculation result by a differential calculation D, and the total value or value according to the total value is set as the braking force BP. Meanwhile, when the road surface is determined to be an ascent road by the ascent road determining portion 43, the first braking force setting portion 42 performs a second calculation processing to obtain the total value of the calculation result by a proportional calculation P and a calculation result by a differential calculation D, and the total value or value according to the total value is set as the braking force BP.

The ascent road determining portion 43 determines whether the road surface which the vehicle is driving is an ascent road or not, based on the braking force BP that is obtained by the first braking force setting portion 42. When the road surface is an ascent road, the ascent road determining portion 43 properly outputs information to the effect that the road surface is an ascent road to the first braking force setting portion 42 and to the second braking force setting portion 44. Also, when the road surface is not the ascent road, the ascent road determining portion 43 properly outputs information to the effect that the road surface is not the ascent road to the first braking force setting portion 42 and to the second braking force setting portion 44. Therefore, in the illustrative embodiment, the ascent road determining portion 43 functions as a determining unit. In the meantime, in the illustrative embodiment, "the ascent road" means that the road surface has a slope (an inclination angle) on which the vehicle is caused to move backward when the braking force is not applied to the wheels FR, FL, RR, RL.

Figure 4:
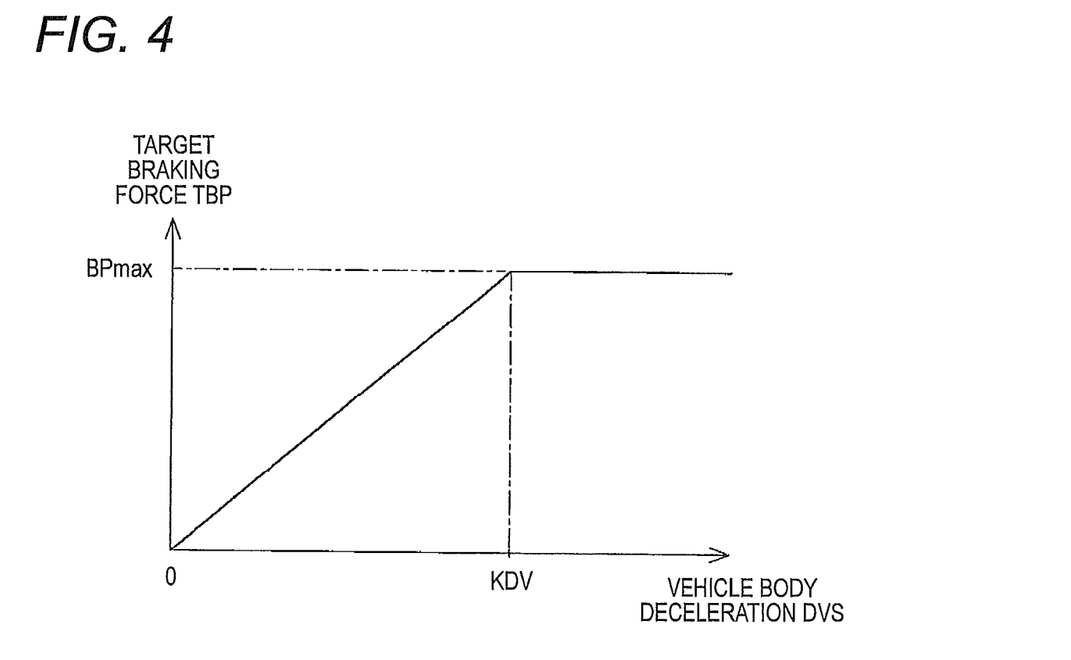
FIG. 4 is a graph that illustrates a relationship between a vehicle body deceleration and a target braking force.

The second braking force setting portion 44 includes the memory portion (not shown) that stores the graph illustrated in FIG. 4. Further, when information to the effect that the road surface is an ascent road is input from the ascent road determining portion 43, the second braking force setting portion 44 sets the target braking force TBP according to the slope of the road surface, based on the graph illustrated in FIG. 4. Thereafter, the second braking force setting portion 44 outputs information which indicates the target braking force TBP into the braking control portion 45. In the illustrative embodiment, the second braking force setting portion 44 functions as the target braking force setting unit.

FIG. 4 is an example of a graph that illustrates a relationship between a vehicle body deceleration DVS and a target braking force TBP. As shown in FIG. 4, the target braking force TBP is set to have a greater value as the vehicle body deceleration DVS is greater when the vehicle body deceleration DVS is less than a predetermined deceleration threshold value KDV, and is set to have a predetermined braking force BPmax regardless of the magnitude of the vehicle body deceleration DVS when the vehicle body deceleration DVS is equal to or greater than a deceleration threshold value KDV. The predetermined braking force BPmax is a maximum value of the braking force which can be applied to the respective wheels FR, FL, RR, RL by the brake actuator 18 of the illustrative embodiment, and is set through an experiment or simulation, etc. performed previously. Further, the target braking force TBP is set to a magnitude such that the backward movement of the vehicle is suppressed by applying the target braking force TBP to the respective wheels FR, FL, RR, RL in a state where the vehicle body deceleration DVS which corresponds to the target braking force TBP is detected.

Referring to FIG. 2 again, the braking control portion 45 controls a motor 29 of the brake actuator 18 and the respective linear electromagnetic valve 23 such that the braking force applied to the respective wheels FR, FL, RR, RL reaches the braking force BP which is set in the first braking force setting portion 42 or the target braking force TBP which is set in the second braking force setting portion 44. Accordingly, in the illustrative embodiment, the control unit 46 (the portion that is enclosed by a dot-dashed line in FIG. 2) is configured by the first braking force setting portion 42 and the braking control portion 45.

Next, ACC control portion 35 is explained. The ACC control portion 35 can obtain various pieces of information about the preceding vehicle (for example, the distance between the preceding vehicle and the present vehicle). Further, when the inter vehicular distance is short and the vehicle is to be stopped, in order to ensure the security of the passengers in the vehicle or the vehicle, ACC control portion 35 sends an instruction, which prohibits performance of the stop control, to ECU 10. Meanwhile, ACC control portion 35 sends an instruction, which is that the stop control has been performed, to the ECU 19 when the inter vehicular distance is long and the vehicle is stopped.

Figure 5:
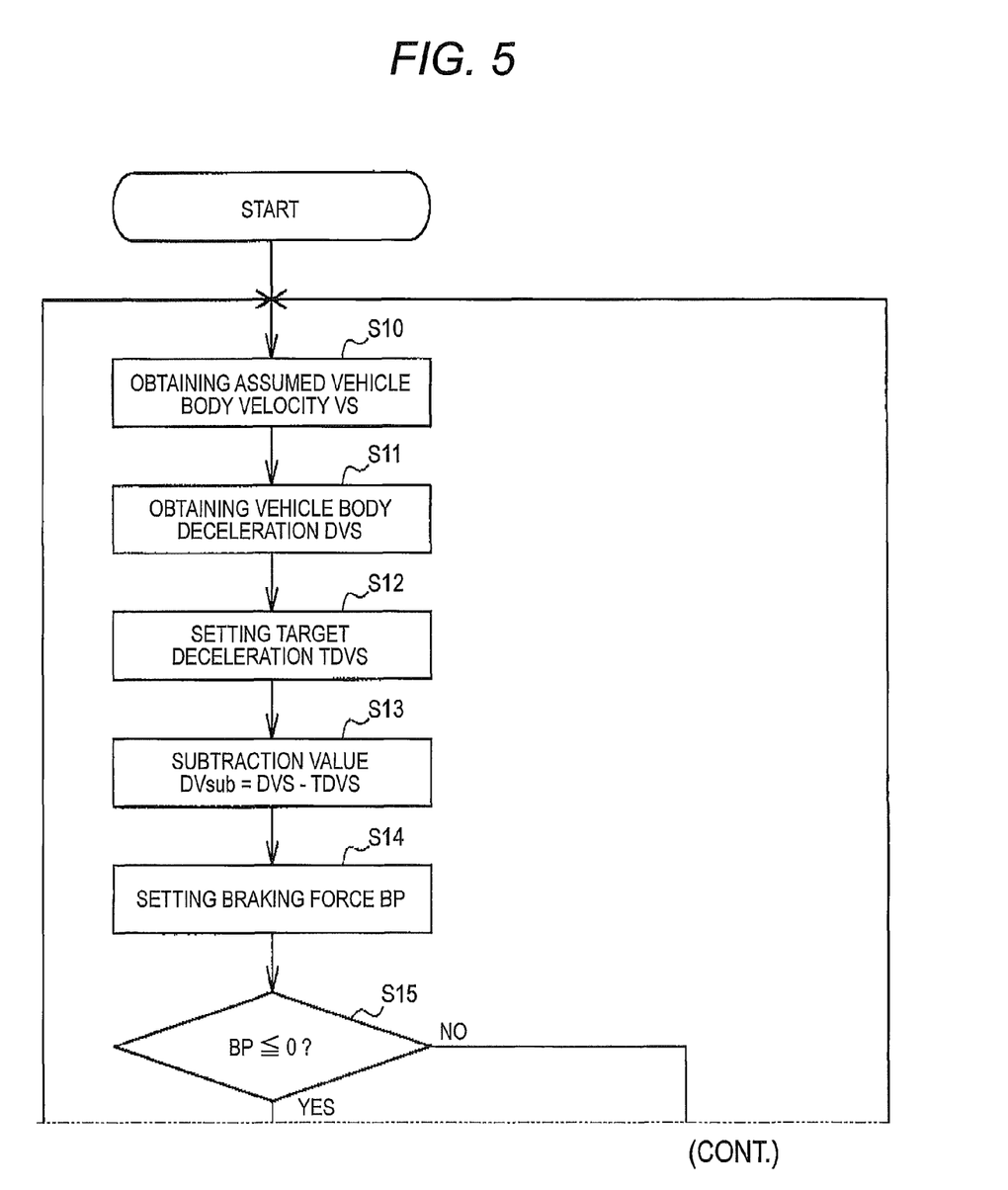
FIG. 5 is a flowchart that illustrates a stop control processing routine according to the first illustrative embodiment.
Figure 6A:
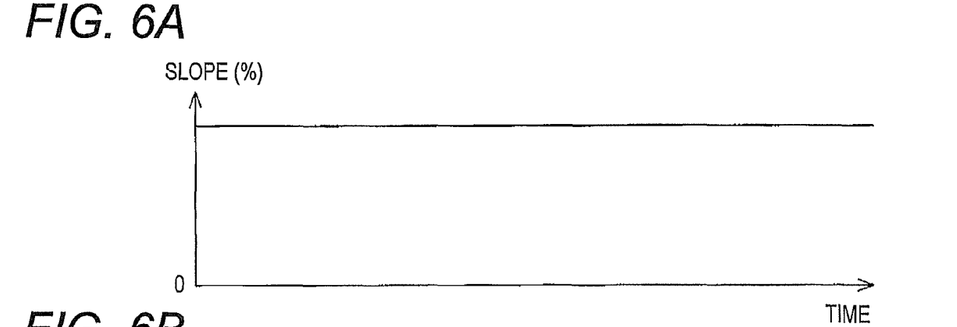
FIG. 6A is a timing chart illustrating a slope of a road surface.
Figure 6B:
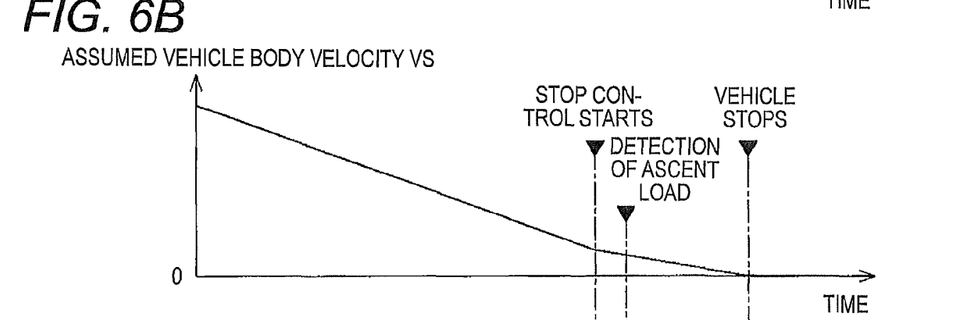
FIG. 6B is a timing chart illustrating variations of an assumed vehicle body velocity.
Figure 6C:
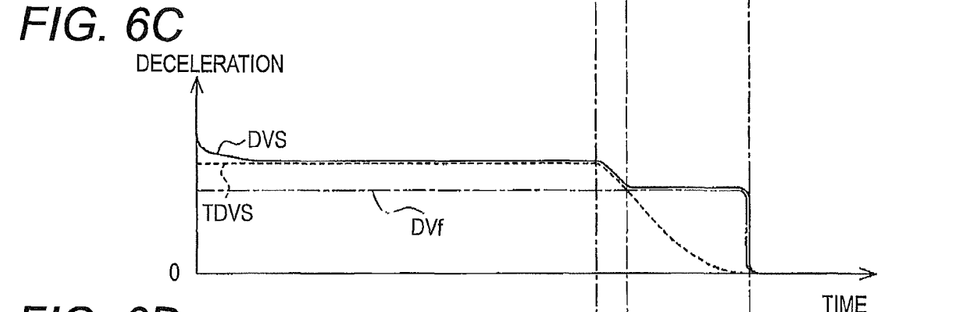
FIG. 6C is a timing chart illustrating variations of the deceleration.
Figure 6D:
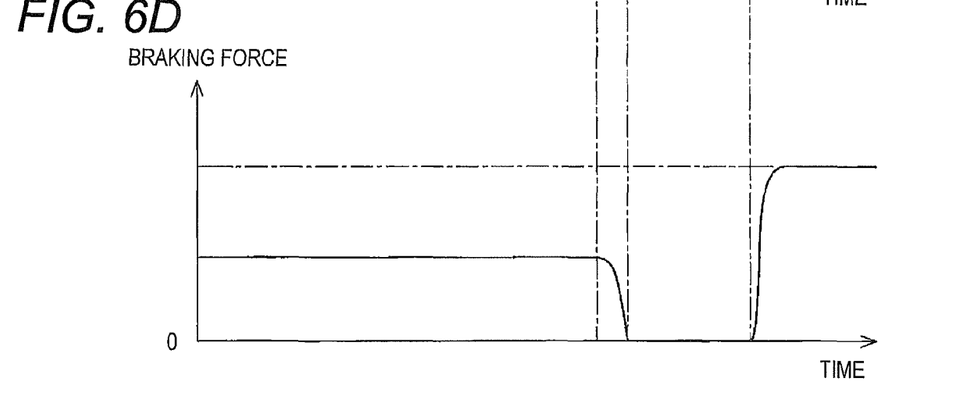
FIG. 6D is a timing chart illustrating variations of the deceleration.
Figure 7:
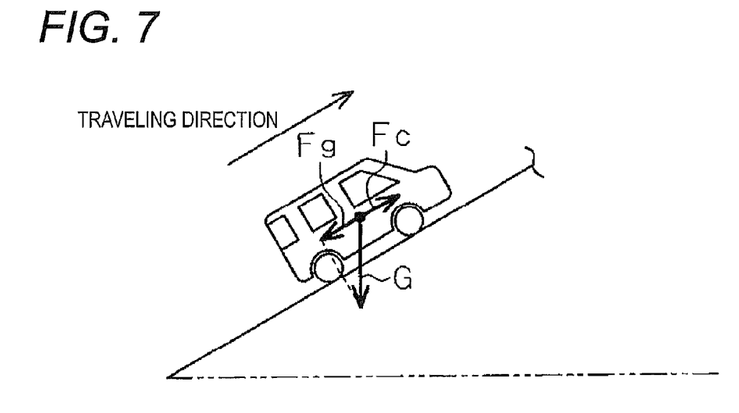
FIG. 7 is a diagram illustrating a relationship in which a force is applied to the vehicle that is driven on an ascent road.
Figure 8A:
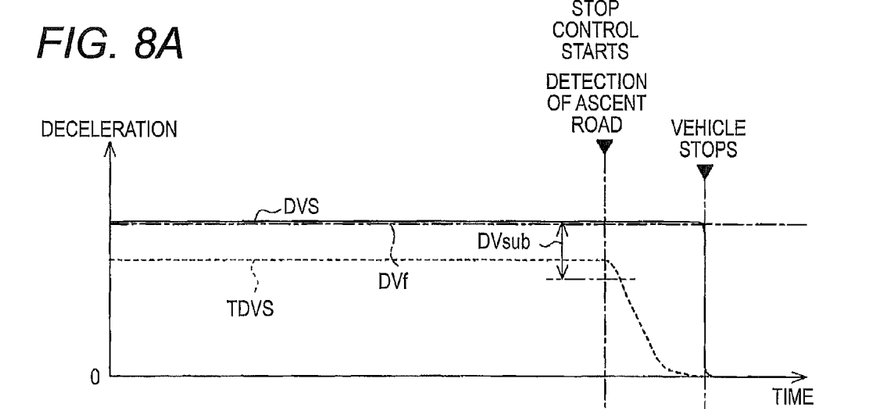
FIG. 8A is a timing chart illustrating variations of deceleration.
Figure 8B:
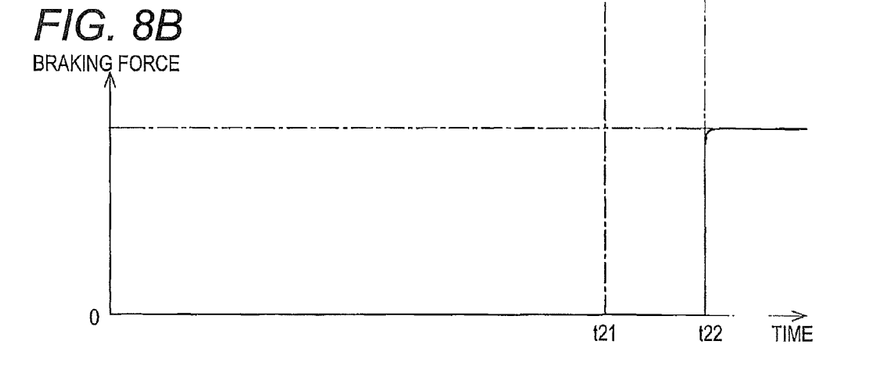
FIG. 8B is a timing chart illustrating variations of the braking force.
Figure 9A:
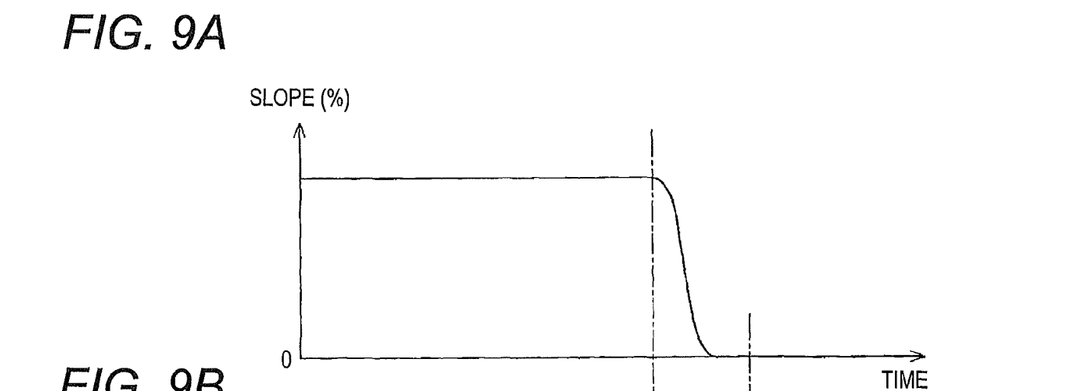
FIG. 9A is a timing chart illustrating variations of the slope of the road surface which the vehicle is driving.
Figure 9B:
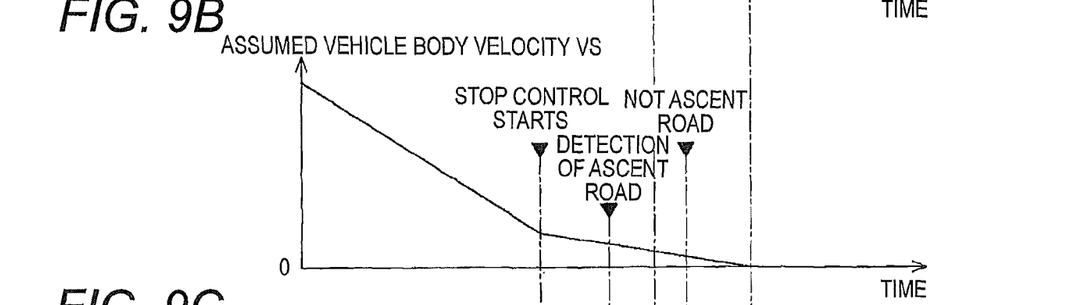
FIG. 9B is a timing chart illustrating variations of the assumed vehicle body velocity.
Figure 9C:
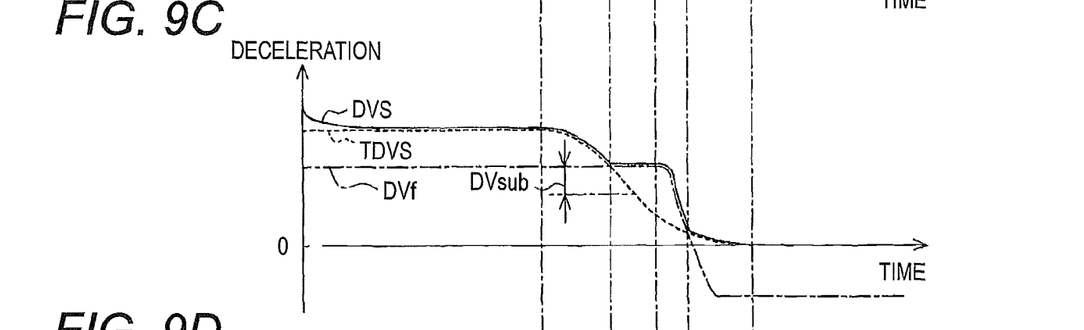
FIG. 9C is a timing chart illustrating variations of the deceleration.
Figure 9D:
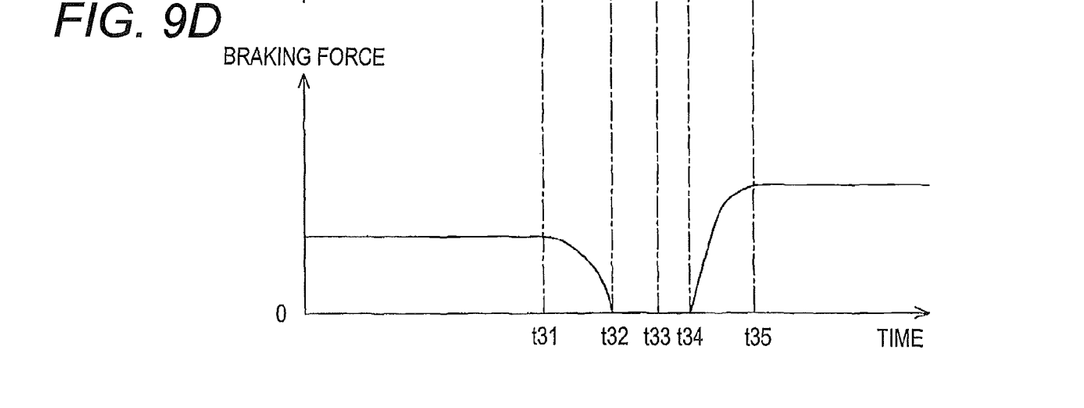
FIG. 9D is a timing chart illustrating variations of the braking force.

Next, the stop control processing routine performed by the ECU 19 of the illustrative embodiment is explained with reference to FIG. 5 illustrating the flow chart, FIG. 6, FIG. 8 and FIG. 9 illustrating the timing chart, and FIG. 7 illustrating the diagram. FIG. 6 is the timing chart in the case where the braking force is applied to the respective wheels FR, FL, RR, RL at the time when the stop control starts. Further, FIG. 8 is the timing chart in the case where the braking force is not yet applied to the respective wheels FR, FL, RR, RL at the time when the stop control starts. FIG. 9 is the timing chart in the case where the slope of the road surface which the vehicle is driving becomes small during performance of the stop control.

The stop control processing routine is performed in the case where the control command having an instruction, which is that the stop control is performed from the ACC control portion 35, is input to ECU 19. In step S10, the vehicle condition calculation portion 40 calculates the velocity of the respective wheels FR, FL, RR, RL based on the detected signal output from the respective wheel velocity sensors SE1 to SE 4, and at least one of the respective wheel velocities allows calculation of the assumed vehicle body velocity VS based on the one wheel velocity. Subsequently, in step S11, the vehicle condition calculation portion 40 temporally differentiates the assumed vehicle body velocity VS which is calculated at the step S10, and obtains the vehicle body deceleration DVS by multiplying the differential result by "−1". In this regard, in this illustrative embodiment, the step 11 corresponds the deceleration obtaining step. In the step S12, the target deceleration setting portion 41 sets the target deceleration TDVS which corresponds to the assumed vehicle body velocity VS which is calculated at the step S10, based on the graph of FIG. 3. That is, in the illustrative embodiment, the step S12 corresponds to the target deceleration setting step.

Subsequently, in a step S13, the first braking force setting portion 42 obtains the subtraction value DVsub (=DVS−TDVS) by subtracting the target deceleration TDVS set at the step S12 from the assumed vehicle body velocity VS calculated at the step S10. Further, in the step S14, the first braking force setting portion 42 sets the braking force BP of the respective wheels FR, FL, RR, RL based on the subtraction value DVsub which is obtained at the step S13. Specifically, in the case where it is determined that the road surface which the vehicle is driving is or was not an ascent road, the braking force BP is calculated by the first calculation processing (i.e., PID control). Meanwhile, when the road surface is determined to be an ascent road, the braking force BP is calculated by the second calculation processing (i.e., PD control). Also, in a case where the target deceleration TDVS has a tendency to decrease (for example, between the first timing t11 and the second timing t12 in FIG. 6), an amount of decrease per unit time of the braking force BP which is calculated by the first calculation processing becomes gradually greater, since the subtraction value DVsub has a tendency to increase. That is, between the first timing t11 and the second timing t12, the braking force BP becomes small as time passes.

Then, in step S15, the ascent road determining portion 43 determines whether the braking force BP which is set at the step S14 is equal to or less than zero or not. In the case where the determined result is a positive determination (BP≤0) the ascent road determining portion 43 determines that the road surface which the vehicle is driving is an ascent road. In the illustrative embodiment, the step S15 corresponds to a determining step. Then, the first braking force setting portion 42 performs the calculation processing of the braking force BP by the second calculation processing (step S16). At this time, the braking control portion 45 operates the brake actuator 18 so that the braking force applied to the respective wheels FR, FL, RR, RL becomes zero. Subsequently, in step S17, the ascent determining portion 43 determines whether the vehicle is stopped or not, based on the assumed vehicle body velocity VS which is obtained at the step S10. Specifically, the ascent road determining portion 43 determines that the vehicle is stopped when the assumed vehicle body velocity VS is equal to or less than a predetermined value which corresponds to a velocity at which the vehicle can be regarded as being stopped. Further, in the case that the determination result of the step S17 is a negative determination, the ascent road determining portion 43 outputs an intention, which is that the step S10 is performed, into the vehicle condition calculation portion 40.

Meanwhile, in the case where the determination result of the step S17 is a positive determination, the second braking force setting portion 44 sets the target braking force TBP which corresponds to the vehicle body deceleration DVS obtained at the step S18, based on the graph of FIG. 4 (step S19). Subsequently, in step S19, the braking control portion 45 controls the brake actuator 18 such that the braking force of the respective wheels FR, FL, RR, RL reaches the target braking force TBP which is obtained at step S18. Specifically, the braking control portion 45 drives the motor 29 such that the discharge amount per unit time of the brake fluid form the pump 30 is substantially constant, and drives the linear electromagnetic valve 23 such that a pressure difference between the master cylinder pressure of the master cylinder 12 and the respective wheel cylinder pressure of the wheel cylinder 20FR, 20FL, 20RR, 20RL becomes the pressure difference according to the target braking force TBP. Then, the stop control processing routine temporarily ends.

In the case where the determination result of the step S15 is a negative determination (BP>0), the first braking force setting portion 42 determines whether the calculation processing of the braking force BP is the second calculation processing or not (step S20). If the determination is a negative determination, the ascent road determining portion 43 determines that the road surface which the vehicle is driving is not the ascent road, and outputs an instruction, which is that step S23 described hereinafter is to be performed, to the braking control portion 45. Meanwhile, in the case where the determination result of the step S20 is a positive determination, the ascent road determining portion 43 determines that the road surface which the vehicle is driving is not an ascent road (or the slope of the road surface became small) any more, and outputs the above instruction into the first braking force setting portion 42.

In step S21, the first braking force setting portion 42 changes the calculation processing of the braking force BP from the second calculation processing to the first calculation processing. Subsequently, in step S22, the ascent road determining portion 43 determines whether the vehicle is stopped or not, based on the assumed vehicle body velocity VS obtained in the step S10. When the determination result is a negative determination, since the vehicle does not stop, the ascent road determining portion 43 outputs an instruction, which is that the above described step S10 is to be performed, to the vehicle condition calculation portion 40. When the determination result of the step S22 is a positive determination, the ascent road determining portion 43 outputs an instruction, which is that the following step S23 is to be performed, into the braking control portion 45.

In the step 23, the braking control portion 45 controls the brake actuator 18 such that the braking force of the respective wheels FR, FL, RR, RL reaches the braking force obtained in step S14. In the illustrative embodiment, the braking step is configured by the step S14 and S23. Thereafter, the stop control routine temporarily ends.

That is, as shown in the timing chart of FIG. 6, the target deceleration TDVS is substantially set at a constant value (=a predetermined value) before the stop control starts. Therefore, the braking force BP of the respective wheels FR, FL, RR, RL is set such that the vehicle body deceleration DVS of the vehicle is constantly maintained following the target deceleration TDVS. At this time, as shown in FIG. 7, the vehicle body deceleration DVS is a value, which is based on the braking force BP of the respective wheels FR, FL, RR, RL, a force that is based on gravity G applied to the vehicle body (a force directed downward of an inclination surface, called "gravity equivalent") Fg, and a creep force (driving force) Fc that is based on a creep phenomenon of the vehicle having a torque converter. Also, the creep force Fc is the driving force which corresponds to the number of rotations of an engine when idling. Further, when the braking force is not applied to the respective wheels FR, FL, RR, RL at a horizontal road surface, the vehicle runs at about "5 km/h" since the creep force Fe is transferred to the driving wheels.

Referring to FIG. 6 again, at the first timing t11 in which the assumed vehicle body velocity VS of the vehicle becomes low and immediately before the vehicle stops, the stop control starts. Then, in order to suppress the swing-back when the vehicle is stopped, the target deceleration TDVS is set to a value, which becomes gradually smaller as the assumed vehicle body velocity VS becomes lower (see FIG. 6B, 6C) based on the graph of FIG. 3. At this time, the braking force BP of the respective wheels FR, FL, RR, RL is set based on the subtraction value DVsub such that the vehicle body deceleration DVC of the vehicle follows the target deceleration TDVS and becomes a small value (see FIG. 6C,6D). Specifically, the braking force BP becomes gradually smaller. Also, in FIG. 6C, the target deceleration TDVS is indicated by a dashed-line.

Thereafter, at the second timing t12, the braking force BP set based on the subtraction value DVsub becomes zero, regardless of whether the assumed vehicle body velocity VS is zero, since the gravity equivalent Fg acts on the vehicle. That is, a frontward movement of the vehicle can be suppressed without applying the braking force to the respective wheels FR, FL, RR, RL. As a result, it is detected that the road surface which the vehicle is driving is an ascent road in the second timing t12.

The vehicle deceleration DVS of the vehicle is maintained at the same magnitude as the deceleration DVf corresponding to the subtraction value (=Fg−Fc) which is obtained by subtracting the creep force Fc from the gravity equivalent Fg, between the second timing t12 and the third timing t13 in which the vehicle is stopped. The gravity equivalent Fg becomes a force which is greater as the slope of the road surface becomes greater. That is, the relationship between the slope of the road surface and the vehicle body deceleration DVS which are obtained from the second timing t12 to the third timing t13 is substantially proportional.

Also, not only the gravity equivalent Fg and the creep force Fc, but also friction force which is generated between the wheels FR, FL, RR, RL and the road surface acts on the vehicle. Therefore, in practice, the vehicle body deceleration DVS of the vehicle is not maintained constantly as the deceleration DVf, and the vehicle body deceleration becomes gradually smaller due to an influence of the frictional force. However, for clear understanding of the invention, the frictional force generated between the respective wheels FR, FL, RR, RL and the road surface is not considered in the illustrative embodiment.

Further, when the forward movement of the vehicle is stopped in the state where the braking force is not applied to the respective wheels FR, FL, RR, RL, there is a possibility that the vehicle will move backward, since the vehicle deceleration DVS of the vehicle reaches a large magnitude corresponding to the deceleration DYF Therefore, the target braking force TBP is set based on the vehicle deceleration DVS which is obtained from the second timing t12 to the third timing t13 (see FIG. 4). Further, at the third timing t13 in which the forward movement of the vehicle is stopped, the brake actuator 18 is operated and the braking force corresponding to the set target braking force TBP is applied to the respective wheels FR, FL, RR, RL. As a result, the backward movement of the vehicle is regulated.

In the illustrative embodiment, the braking force corresponding to the target braking force TBP is applied to the respective wheels FR, FL, RR, RL immediately after the vehicle is stopped. Therefore, compared to the case where the braking force corresponding to the target braking force TBP is applied to the respective wheels FR, FL, RR, RL when the vehicle is not stopped, the swing-back of the vehicle is favorably suppressed.

Further, as shown in the timing chart of FIG. 8, when the braking force BP of the respective wheels FR, FL, RR, RL is zero before the first timing t21 in which the stop control starts, the braking force BP is maintained at zero based on the subtraction value DVsub even though the stop control starts. At this time, in the first timing t12, since the braking force BP based on the subtraction value DVsub is zero, it is detected that the road surface is an ascent road. Thereafter, in the second timing t22 in which the forward movement of the vehicle is restricted, the brake actuator 18 is activated, and the braking force of the respective wheels FR, FL, RR, RL is adjusted such that the braking force reaches the target braking force TBP according to the slope of the road surface. As a result, the backward movement of the vehicle is regulated.

Also, as shown in the timing chart of FIG. 9, the stop control starts at the first timing t31. Further, in the second timing t32 after the first timing t31, since the braking force BP becomes zero, it is detected that the road surface which the vehicle is driving is an ascent road. Thereafter, in the third timing t33 before the forward movement of the vehicle is restricted, the slope of the road surface which the vehicle is driving rapidly becomes small, and if the road surface is horizontal, the gravity equivalent Fg which is applied to the vehicle becomes small. That is, the deceleration DVf becomes gradually smaller as the gravity equivalent Fg becomes smaller. Then, as the creep force Fc becomes greater than the gravity equivalent Fg, the vehicle body deceleration DVS of the vehicle starts to be decreased following the deceleration DVf.

Thereafter, in the fourth timing t34, the vehicle deceleration DVS starts to become small, and the vehicle deceleration DVS reaches the target deceleration TDVS. If so, the braking force BP which is the force based on the subtraction value DVsub (=DVS−TDVS) and is set by the second calculation processing, becomes a greater value than zero. Specifically, the sum total value of the calculation result by the proportional calculation and the calculation result by the integral calculation becomes greater than zero. In this case, since the braking force BP set by the subtraction value DVsub is greater than zero, it is detected that the road surface which the vehicle is driving is not an ascent road.

Then, after the fourth timing t34, a calculation method of the braking force BP is changed from the second calculation processing to the first calculation processing, and the interrupted integral calculation restarts. As a result, the braking force BP according to the subtraction value DVsub is set by the first calculation processing, and the brake actuator 18 based on the braking force BP is actuated. Therefore, the braking force BP is applied to the respective wheels FR, FL, RR, RL. Thereafter, in the fifth timing t35, the vehicle is stopped. At this time, since the braking force BP is applied to the respective wheels FR, FL, RR, RL, a backward movement of the vehicle is regulated even though the braking force BP of the respective wheels FR, FL, RR, RL is increased.

According to the above-described illustrative embodiment, the following effects can be obtained.

(1) Generally, when the vehicle that is traveling on an ascent road is stopped, the forward movement of the vehicle can be restricted by the gravity equivalent FG which is applied to the vehicle body although the braking force is not applied to the wheels FR, FL, RR, RL. At this time, the braking force BP based on the subtraction value DVsub becomes gradually smaller due to the stop control, and as a result, the braking force becomes zero.

Therefore, in the illustrative embodiment, when the braking force BP which is set according to the subtraction value DVsub is zero, it is determined that the road surface is an ascent road. That is, by using the braking force BP which is obtained as a necessary parameter of the stop control for stopping the vehicle, it is determined whether the road surface is an ascent road or not. The braking force BP can be obtained without using the accelerator sensor or the liquid pressure sensor, etc. Therefore, it can be detected that the road surface which the vehicle is driving is an ascent road without using the liquid pressure sensor or the accelerator sensor.

(2) After the road surface which the vehicle is driving is determined to be an ascent road, if the vehicle is stopped in the state where the braking force is not applied to the wheels FR, FL, RR, RL, the braking force is applied to the wheels FR, FL, RR, RL at the timing at which the vehicle is stopped. Therefore, the backward movement of the vehicle can be regulated. Also, since the braking force of the wheels FR, FL, RR, RL is applied immediately after the vehicle is stopped, compared to the case in which the braking force of the wheels FR, FL, RR, RL is applied before the vehicle is stopped, the swing-back which is generated based on the braking force applied to the wheels FR, FL, RR, RL can be suppressed.

(3) Also, in the illustrative embodiment, when the vehicle is stopped on an ascent road, the target braking force TBP is applied to the wheels FR, FL, RR, RL based on the vehicle body deceleration DVS, which is obtained during the time period from the time when the road surface which the vehicle is driving is determined to be an ascent road to the time when the vehicle is stopped. Therefore, the braking force can be properly applied to the wheels FR, FL, RR, RL according to the conditions of the road surface on which the vehicle is stopped.

(4) Also, the target braking force TBP is set to a larger value as the vehicle body deceleration DVS becomes greater. Therefore, compared to the case where the braking force larger than necessary braking force of the wheels FR, FL, RR, RL is applied, it is sufficient that only the braking force corresponding to the slope of the road surface is applied to wheels FR, FL, RR, RL, and thus, power consumption of the brake actuator 18 can be suppressed when the stop control is performed.

(5) There is a case where after the road surface which the vehicle is driving is determined to be an ascent road, the slope of the road surface becomes small. In this case, since the gravity equivalent Fg becomes small according to the variation of the slope of the road surface, it is necessary that the braking force is applied to the wheels FR, FL, RR, RL so as to stop the vehicle. Here, if the braking force BP is calculated by the first calculation processing including the integral calculation even after it is determined that the road surface is an ascent road, the calculation result by means of the integral calculation becomes a negative value when the road surface is determined to be an ascent road. Therefore, since the calculation result by means of the integral calculation is hardly to become a positive value regardless of the necessity that the braking force is applied to the wheels according to variations of the slope of the road surface, there is a possibility that a lapse will occur from the time when the vehicle is stopped to the time when the application of the braking force of the wheels FR, FL, RR, RL starts.

However, in the illustrative embodiment, the braking force BP is applied by the second calculation processing which does not include the integral processing after it is determined to be the ascent road. If the subtraction value DVsub becomes small according to variations of the slope of the road surface, the braking force BP which is set by the second calculation processing is rapidly set to be a positive value. As a result, the braking force can be rapidly applied to the wheels FR, FL, RR, RL, making it possible to contribute to the stopping of the vehicle.

Further, if the braking force BP which is set by the second calculation processing becomes equal to or more than zero, the calculation method of the braking force BP is changed from the second calculation processing to the first calculation processing. That is, the integral calculation which has been stopped in response to the determination that the road surface is the ascent road restarts. Further, the braking force BP which is set by the first calculation processing is applied to the wheels FF, FR, RR, RL. Therefore, compared to the case where the braking force BP which is set by the second calculation processing is applied to the wheels FR, FL, RR, RL, the braking force BP can be very finely adjusted, and the swing back at the time when the vehicle is stopped can be suppressed.

(7) Also, in the illustrative embodiment, the swing back and the backward movement of the vehicle at the time of the stopping of the vehicle are suppressed by regulating the braking force of the wheels FR, FL, RR, RL. Therefore, compared to the prior case where the braking force is applied to the wheels so as to suppress the backward movement of the vehicle at the timing of the stopping of vehicle, it is sufficient that the driving of the engine is not adjusted, and consumption of fuel which is fed to the engine can be reduced.

(8) When the road surface which the vehicle is driving is determined to not be an ascent road, by setting the driving force BP corresponding to the subtraction value DVsub, the vehicle can be stopped while the swing back of the vehicle is suppressed.

Second Illustrative Embodiment

Figure 10:
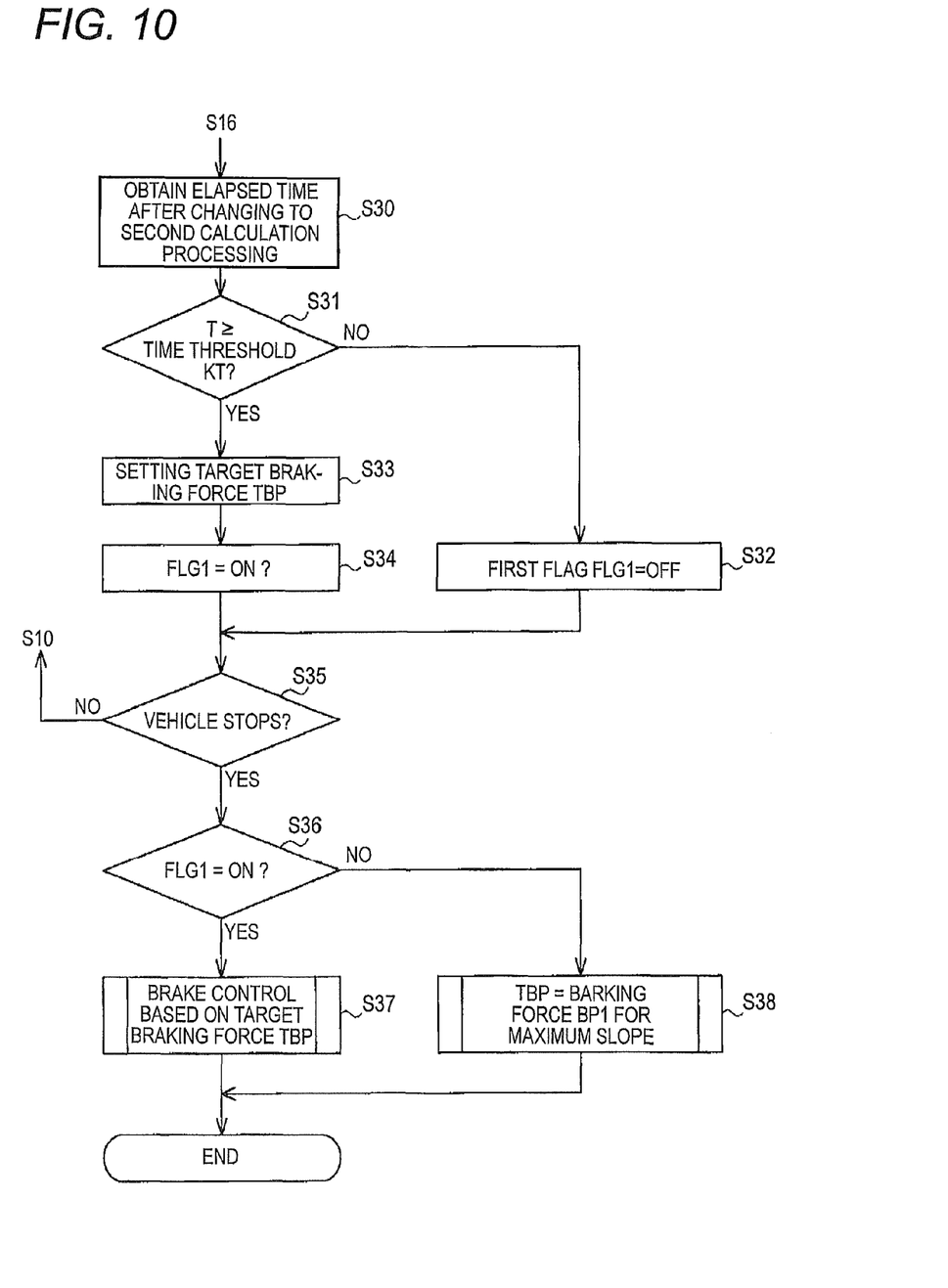
FIG. 10 is a flow chart illustrating a portion of the stop control processing routine according to a second illustrative embodiment of the preset invention.

Next, the second illustrative embodiment of the present invention will be explained with reference to FIG. 10. The stop control processing routine of the second illustrative embodiment is different from that of the first illustrative embodiment in a part thereof. Therefore, only the part different from the first illustrative embodiment is explained below, and same parts or corresponding parts to the first illustrative embodiment have the same numbers attached and explanations thereof are omitted.

The stop control processing routine performed by the ECU 19 of the illustrative embodiment is explained according to the flow chart of FIG. 5. The stop control processing routine of the second illustrative embodiment is almost identical to the stop control processing routine of the first illustrative embodiment in the steps S10-S16 and the steps S20-S23. Thus, in this second illustrative embodiment, only the determination processing after the step S16 is explained.

In the stop control processing routine, the braking force BP which is set in step S14 is determined to be equal to or less than zero (step S15 is a positive determination), when the calculation method of the braking force BP is changed to the second calculation processing (step S16), a processing of the step 30 is performed. In the step 30, a second braking force setting portion 44 obtains an elapse time T, which is obtained when the calculation method of the braking force BP at the first braking force setting portion 42 is changed from the first calculation processing to the second calculation processing. Subsequently, in step S31, the second braking force setting portion 44 determines whether the elapse time T obtained in the step S30 is equal to or more than a predetermined time threshold KT or not. The time threshold KT is predetermined as a time period from the time when the braking force BP is set by the second calculation processing to the time when the vehicle body deceleration DVS can be obtained by the number of rotations (for example, 5 times).

Also, when the determination result of the step S31 is a negative determination (T<KT), the second braking force setting portion 44 temporarily stores the vehicle body deceleration DVS at this time, sets a first graph FLG1 "OFF" (step S32), and outputs an instruction, which is that the step S35 described hereinafter is to be performed, to the ascent road determining portion 43. Meanwhile, when the determination result of the step S31 is a positive determination (T≥KT), the second braking force setting portion 44 sets the target braking force TBP corresponding to the vehicle body deceleration DVS which is obtained in step S11, based on the graph of FIG. 4. At this time, the vehicle body deceleration DVS is an average value of a plurality of vehicle body decelerations DVS which are obtained when the elapse time T is equal to or less than the time threshold KT. Subsequently, in the step 34, the second braking force setting portion 44 sets the first graph FLG1 to "ON", and outputs an instruction, which is that the next step S35 is to be performed, into the ascent road determining portion 43.

Further, in the step 35, same as the step S17, the ascent road determining portion 43 determines whether the vehicle is stopped or not, based on the assumed vehicle body velocity VS which is obtained at the step 10. Further, when the determination result of the step S35 is a negative determination, the ascent road determining portion 43 outputs an instruction, which is that the above described step 10 is to be performed, to the vehicle condition calculation portion 40.

Meanwhile, when the determination result of the step S35 is determined to a positive determination, the second braking force setting portion 44 determines whether the first graph FLG1 is "ON" or not (step S36). When the determination result is a positive determination (FLG1=ON), the second braking force setting portion 44 outputs information which indicates the target braking force TBP set in step S33 to the brake control portion 45. Then, the brake control portion 45 controls the brake actuator 18 such that the braking force of the wheels FR, FL, RR, RL reaches the target braking force TBP obtained in step S33 (step S37). Thereafter, the stop control processing routine temporarily ends.

Meanwhile, when the determination result of the step S36 is a negative determination (FLG1=OFF), the second braking setting portion 44 outputs information which indicates the target braking force TBP to the brake control portion 45, and the target braking force TBP is a braking force BP1 for maximum slope. The braking force BP1 for maximum slope is the target braking force corresponding to the maximum value (for example 30%) of the slope of the road surface which is assumed in the adaptive cruise control. Then, the brake control portion 45 controls the brake actuator 18 such that the braking force of the respective wheels FR, FL, RR, RL reaches the target braking force TBP obtained in step S33 (step S38). Thereafter, the stop control processing routine temporarily ends.

In the illustrative embodiment, when the vehicle is stopped at the time when the elapse time T after the road surface which the vehicle is driving is determined to be an ascent road is less than the time threshold KT, the target braking force TBP corresponding to the slope of the road surface which the vehicle is driving is not set. Therefore, the target braking force TBP becomes the braking force BP1 for a maximum slope, and the brake actuator 18 is operated such that the braking force BP1 for the maximum slope is applied to the respective wheels FR, FL, RR, RL. As a result, the backward movement of the vehicle is firmly regulated.

Meanwhile, when the vehicle is stopped at the time when the elapse time T after the road surface which the vehicle is driving is determined to be an ascent road is equal to or more than the time thresholds KT, the target braking force TBP corresponding to an average value of the plurality of vehicle body decelerations DVS is set. Further, the brake actuator 18 is operated such that the target braking force TBP is applied to the respective wheels FR, FL, RR, RL. As a result, the electric power consumption of the brake actuator 18 can be reduced and the backward movement of the vehicle is regulated.

According to the second illustrative embodiment, in addition to the effects (1), (2), (4) to (8) of the first illustrative embodiment, the following effect can be obtained.

(9) The vehicle body deceleration DVS is the value which is calculated based on the detection signal output from the respective wheel velocity sensors SE1 to SE4, and the detection signal includes noise caused by disturbances, vibrations of the vehicle, etc. It includes the possibility that the vehicle body deceleration DVS which is calculated based on the detection signal including the noise is different from the actual vehicle body deceleration. Therefore, it is difficult to say that the target braking force TBP which is set based on the vehicle body deceleration DVS is the braking force corresponding to the actual slope of the road surface.

However, in the illustrative embodiment, a plurality of the vehicle body deceleration DVS is obtained during the time period from the time when the road surface which the vehicle is driving is determined to be an ascent road to the time corresponding to the time threshold KT, and the target braking force TBP corresponding to the average value of the respective vehicle body deceleration DVS is set. Thus, the target braking force TBP can be suppressed from being significantly deviated from the braking force corresponding to the actual slope of the road surface which the vehicle is driving. Therefore, at the timing in which the vehicle is stopped, the backward movement of the vehicle is regulated by applying the target braking force TBP corresponding to the average value of the respective vehicle body deceleration DVS to the respective wheels FR, FL, RR, RL.

(10) Moreover, in the illustrative embodiment, when the vehicle is stopped at the time when the elapse time T after the road surface which the vehicle is driving is determined to be an ascent road is less than the time threshold KT, since the target braking force TBP corresponding to the average value of the plurality of vehicle body decelerations DVS is not set yet, the braking force for maximum slope BP1 is applied to the respective wheels FR, FL, RR, RL. Therefore, even when the vehicle is stopped in the state where the target braking force TBP corresponding to the average value of the plurality of vehicle body decelerations DVS is not yet set, the backward movement of the vehicle is regulated by applying the braking force of maximum slope BP1 to the respective wheels FR, FL, RR, RL at the timing in which the vehicle is stopped.

While the present invention has been shown and described with reference to certain illustrative embodiments thereof, it will be understood by those skilled in the art that various changes in form and details may be made therein without departing from the spirit and scope of the invention as defined by the appended claims.

In the respective illustrative embodiments, the first calculation processing can be performed even after the road surface which the vehicle is driving is determined to be an ascent road. However, it is advantageous that the braking force BP is set based on any one of the first calculation result of the proportional calculation, the second calculation result of the differential calculation, and the sum value of the first calculation result and the second calculation result after the road surface which the vehicle is driving is determined to be an ascent road. Also, when the set braking force BP exceeds zero, it is advantageous that the result of the integral processing which is calculated before then is reset. According to this configuration, delay of the timing in which the braking force BP is applied to the wheels FR, FL, RR, RL is suppressed.

In the respective illustrative embodiments, the second calculation processing may include only the proportional calculation, or may include only the integral calculation.

In the first illustrative embodiment, the target braking force TBP may be set as a constant value regardless of the magnitude of the vehicle body deceleration DVS after the road surface which the vehicle is driving is determined to be an ascent road. In this case, the target braking force TBP may be the braking force BP1 for maximum slope or the predetermined braking force BPmax.

In the respective illustrative embodiments, the target deceleration TDVS may be set based on the assumed vehicle body velocity VS and other parameters other than the assumed vehicle body velocity VS. For example, μ value of the road surface (specifically, a slip amount of the driven wheels) may be the parameter so as to set the target deceleration TDVS. In this case, the target deceleration TDVS may be set as a smaller value as the slip amount is greater.

In the respective illustrative embodiments, the stop control may be performed even when the vehicle is stopped by manipulating the brake pedal 21 by the driver. If the stop control is performed when the driver manipulates the brake pedal, the linear electromagnetic valve 23 of the brake actuator 18 and the decompression valve 27a, 27b is driven so that the braking force BP of the wheels FR, FL, RR, RL reaches the braking force which is set to correspond to the subtraction value DVsub. As a result, even when the stop control is performed when the driver manipulates the brake pedal, it can be determined whether the road surface is an ascent road or not, further, whereby the stop control is properly performed according to the slope of the road surface which the vehicle is driving.

In the respective illustrative embodiments, the liquid pressure sensor which detects the master cylinder pressure and the acceleration sensor which detects the acceleration (deceleration) of the vehicle may be installed in the control device 11. In the case, it can be determined whether the road surface which the vehicle is driving is an ascent road or not without using the liquid pressure sensor or the acceleration sensor.

The stop control device of the illustrative embodiments may be applied to a vehicle having a transmission (a dual clutch type transmission) which does not generate the creep force Fc.

What is claimed is:

1. A vehicle stop control device configured to perform a stop control for stopping a vehicle by adjusting a braking force for wheels while the vehicle is decelerating, the vehicle stop control device comprising:

a target deceleration setting unit configured to set a target deceleration as a target for stopping the vehicle so as to have a smaller value as a vehicle body velocity comes closer to zero;

a deceleration obtaining unit configured to obtain a vehicle body deceleration of the vehicle;

a control unit configured to perform the stop control which sets the braking force to have a smaller value as a subtraction value which is the result of subtracting the target deceleration set by the target deceleration setting unit from the vehicle body deceleration obtained by the deceleration obtaining unit is greater, and causes the set braking force to be applied to the wheels; and a determining unit configured to determine, when the braking force set by the control unit is zero, that a road surface which the vehicle is driving on has a slope on which the vehicle would be caused to move backward in the event the braking force is not applied to the wheels, wherein the control unit is configured to set the braking force according to the subtraction value by a first calculation processing including an integral calculation before the road surface which the vehicle is driving on is determined to have the slope on which the vehicle would be caused to move backward in the event the braking force is not applied to the wheels by the determining unit, and set the braking force according to the subtraction value by a second calculation processing which does not include an integral calculation after the road surface is determined to have the slope on which the vehicle would be caused to move backward in the event the braking force is not applied to the wheels by the determining unit.

2. The vehicle stop control device according to claim 1, wherein the second calculation processing includes at least one of a proportional calculation and a differential calculation, to set the braking force according to the subtraction value.

3. The vehicle stop control device according to claim 1, wherein after the road surface which the vehicle is driving on is determined to have the slope on which the vehicle would be caused to move backward in the event the braking force is not applied to the wheels by the determining unit, when the braking force which is set according to the subtraction value becomes a value greater than zero, the control unit performs the stop control such that the braking force according to the subtraction value is set by the first calculation processing and causes the braking force to be applied to the wheels.

4. The vehicle stop control device according to claim 1, further comprising:

a target braking force setting unit configured to set a target braking force based on the vehicle body deceleration obtained by the deceleration obtaining unit during a time period from a time when the road surface is determined to have the slope on which the vehicle would be caused to move backward in the event the braking force is not applied to the wheels by the determining unit to a time when the vehicle is stopped, wherein after the road surface is determined to have the slope on which the vehicle would be caused to move backward in the event the braking force is not applied to the wheels by the determining unit, when it is detected that the vehicle is stopped, the control unit performs the stop control such that the braking force to the wheels reaches the target braking force set by the target braking force setting unit.

5. The vehicle stop control device according to claim 1, wherein after the road surface is determined to have the slope on which the vehicle would be caused to move backward in the event the braking force is not applied to the wheels by the determining unit, when it is detected that the vehicle is stopped, the control unit performs the stop control such that the braking force to the wheels reaches a target braking force which is a preset value corresponding to an assumed maximum value of a slope of the road surface.

6. A vehicle stop control method for stopping a vehicle by adjusting a braking force for wheels while the vehicle is decelerating, the method comprising:

setting a target deceleration as a target for stopping the vehicle so as to have a smaller value as a vehicle body velocity comes closer to zero;

obtaining a vehicle body deceleration;

performing braking while setting the braking force to have a smaller value as a subtraction value which is the result of subtracting the set target deceleration from the obtained vehicle body deceleration to cause the set braking force to be applied to the wheels; and determining, when the set braking force is zero, that a road surface which the vehicle is driving on has a slope on which the vehicle would be caused to move backward in the event the braking force is not applied to the wheels, wherein the braking force is set according to the subtraction value by a first calculation processing including an integral calculation before the road surface which the vehicle is driving on is determined to have the slope on which the vehicle would be caused to move backward in the event the braking force is not applied to the wheels, and the braking force is set according to the subtraction value by a second calculation processing which does not include an integral calculation after the road surface is determined to have the slope on which the vehicle would be caused to move backward in the event the braking force is not applied to the wheels.

* * * * *